(12) United States Patent
Huang

(10) Patent No.: US 10,209,570 B2
(45) Date of Patent: Feb. 19, 2019

(54) LIQUID CRYSTAL DISPLAY AND METHOD OF MANUFACTURING THEREOF

(71) Applicant: Shenzhen China Star Optoelectronics Technology Co., Ltd., Shenzhen (CN)

(72) Inventor: Shishuai Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 337 days.

(21) Appl. No.: 15/021,704

(22) PCT Filed: Feb. 24, 2016

(86) PCT No.: PCT/CN2016/074470
§ 371 (c)(1),
(2) Date: Mar. 14, 2016

(87) PCT Pub. No.: WO2017/117848
PCT Pub. Date: Jul. 13, 2017

(65) Prior Publication Data
US 2017/0199430 A1    Jul. 13, 2017

(30) Foreign Application Priority Data
Jan. 8, 2016 (CN) .......................... 2016 1 0013807

(51) Int. Cl.
*G02F 1/1333* (2006.01)
*G02F 1/1337* (2006.01)
(Continued)

(52) U.S. Cl.
CPC ...... *G02F 1/133711* (2013.01); *G02F 1/1337* (2013.01); *G02F 1/1339* (2013.01);
(Continued)

(58) Field of Classification Search
CPC ............ G02F 1/133711; G02F 1/1339; G02F 1/13394; G02F 1/133514; G02F 1/1337; G02F 1/133723
(Continued)

(56) References Cited

U.S. PATENT DOCUMENTS 6,414,733 B1 * 7/2002 Ishikawa ............... G02F 1/1339
349/106
7,643,123 B2 * 1/2010 Baek ..................... G02F 1/1339
349/153
(Continued)

FOREIGN PATENT DOCUMENTS

CN    102402071    4/2012
CN    103033992    4/2013
(Continued)

*Primary Examiner* — Charles Chang

(57) ABSTRACT

A liquid crystal display includes a substrate defining an active area and a non-active area surrounding the active area, a sealant located on the non-active area for hermetically connecting with another substrate to seal a crystal liquid layer between the substrate and the another substrate, and an alignment film barrier wall formed on the non-active area and located between the sealant and the active area. The barrier wall has a wave-shaped configuration consisting of protrusions projecting toward the active area and recesses recessed from the active area. When liquid polyimide is applied to the substrate to from an alignment film, the liquid polyimide is injected at fronts of the protrusions; then the liquid polyimide flows along the wave-shaped barrier wall to enter the recesses thereof.

13 Claims, 4 Drawing Sheets

(51) Int. Cl.
*G02F 1/1335* (2006.01)
*G02F 1/1339* (2006.01)

(52) U.S. Cl.
CPC .... *G02F 1/13394* (2013.01); *G02F 1/133514* (2013.01); *G02F 1/133723* (2013.01)

(58) Field of Classification Search
USPC .................................................. 349/153–157
See application file for complete search history.

(56) References Cited

U.S. PATENT DOCUMENTS

| | | | |
|---|---|---|---|
| 7,948,598 B2 * | 5/2011 | Katsumura | G02F 1/1341 349/153 |
| 9,063,379 B2 | 6/2015 | Kim et al. | |
| 2004/0160566 A1 * | 8/2004 | Kawabe | G02F 1/1341 349/153 |
| 2008/0137022 A1 * | 6/2008 | Komeno | G02F 1/1337 349/153 |
| 2013/0141677 A1 | 6/2013 | Wu et al. | |
| 2015/0060806 A1 * | 3/2015 | Park | H01L 51/5253 257/40 |
| 2015/0185516 A1 * | 7/2015 | Lee | G02F 1/1339 349/110 |
| 2016/0195741 A1 * | 7/2016 | Shiau | G02F 1/1337 349/106 |
| 2017/0110477 A1 * | 4/2017 | Han | H01L 27/124 |

FOREIGN PATENT DOCUMENTS

| | | |
|---|---|---|
| CN | 103809327 | 5/2014 |
| CN | 105204237 | 12/2015 |
| JP | 10-177177 | 6/1998 |

* cited by examiner

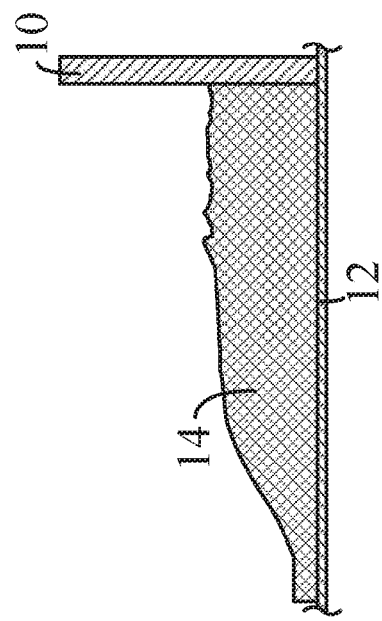
FIG. 1C (PRIOR ART)
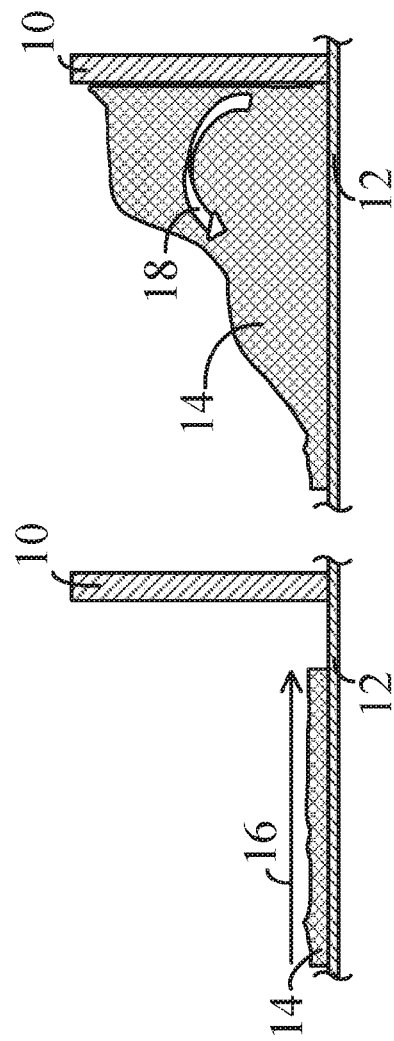
FIG. 1B (PRIOR ART)
FIG. 1A (PRIOR ART)

LIQUID CRYSTAL DISPLAY AND METHOD OF MANUFACTURING THEREOF

RELATED APPLICATIONS

This application is a National Phase of PCT Patent Application No. PCT/CN2016/074470 having International filing date of Feb. 24, 2016, which claims the benefit of priority of Chinese Patent Application No. 201610013807.8 filed on Jan. 8, 2016. The contents of the above applications are all incorporated by reference as if fully set forth herein in their entirety.

FIELD AND BACKGROUND OF THE INVENTION

The present invention relates to a liquid crystal display (LCD) and method of manufacturing thereof, and, in particular, to a structure of a barrier wall for forming an alignment film of an LCD, and a method for forming the alignment film.

Liquid crystal displays (LCDs), particularly, thin film transistor LCDs (TFT LCDs) have become the main products of the flat displays presently available in the market. The TFT LCD has become an important display platform for the present information appliance and audio/video system.

A TFT LCD basically includes an array substrate, a color filter and a liquid crystal layer located between the array substrate and the color filter. When the characteristics of electrical field between the array substrate and the color filter change, the liquid crystal molecules in the liquid crystal layers which guides light transmission from the array substrate to the color filter are twisted with different degrees so that light with different intensities can reach the color filter, thereby to display a desired image.

To enable the liquid crystal molecules in the liquid crystal layer to have a predetermined orientation, an alignment film is applied on one or each of the array substrate and color filter. Then grooves are formed in the alignment film to form an alignment layer. The alignment film is made of liquid polyimide (PI) which is applied to the array substrate and/or color filter by ink-jet printing. To prevent the liquid PI from diffusing too quickly which may contaminate a sealant for hermetically connecting the array substrate and the color filter together, an alignment film barrier wall is formed between the sealant and an active area of the substrate. The barrier wall is made of polystyrene (PS) and has a height which can be as large as tenfold of a thickness of the alignment film.

Referring to FIG. 1A, a barrier wall 10 is formed on a color filter 12. Liquid PI 14 is applied to the color filter 12 and flows toward the barrier wall 10 along a direction indicated by an arrow 16. The barrier wall 10 is a straight, flat wall perpendicularly erected from the color filter 12. The liquid PI 14 is applied to a top surface of the color filter 12 through multiple injection points.

Referring to FIG. 1B, when the liquid PI 14 reaches the barrier wall 10, it is blocked by the barrier wall 10. A large reaction force is exerted by the barrier wall 10 to the liquid PI 14, which causes the liquid PI 14 to flow upwardly and backwards as indicated by an arrow 18.

Referring to FIG. 1C, the liquid PI 14 which flows backwards cannot evenly extend over the top surface of the color filter 12, but accumulates at a place near the barrier wall 10, resulting in that the alignment film has an uneven thickness. Such an uneven thickness of the alignment film can cause the TFT LCD to have problems of gap mura. Accordingly, the yield rate of the TFT LCD is adversely affected and low.

In addition, for the straight, flat, perpendicularly erected barrier wall 10 of the prior art, the injected liquid PI 14 has the possibility of overflow through the barrier wall 10 if the injection speed of the liquid PI 14 is not well controlled. When this happens, the liquid PI 14 can reach the sealant to contaminate the sealant, which may result in a peeling-up of the sealant.

Accordingly, it is needed to provide a barrier wall for an alignment film and a method for manufacturing an alignment film, in order to solve the problems of the prior art.

SUMMARY OF THE INVENTION

The present invention provides a liquid crystal display including a substrate defining an active area and a non-active area surrounding the active area. A sealant is located at the non-active area of the substrate, configured for hermetically connecting with another substrate to seal a liquid crystal layer between the two substrates. A rectangular alignment film barrier wall is formed on the non-active area of the substrate and located between the sealant and the active area. An alignment film is formed on the active area of the substrate and extends outward to reach the barrier wall. The barrier wall has four walls each having a wavelike configuration.

In one preferred embodiment of the present invention, the alignment film is made of polyimide (PI) and the barrier wall is made of polystyrene (PS).

In one preferred embodiment of the present invention, the substrate forms a liquid PI injection mark at a corner between a wall and an adjacent wall of the barrier wall.

In one preferred embodiment of the present invention, the injection mark is located between two neighboring protrusions respectively of two adjacent walls of the barrier wall.

In one preferred embodiment of the present invention, the substrate is at least one of an array substrate and a color filter.

In one preferred embodiment of the present invention, a slit is defined between two confronting ends of two adjacent walls of the barrier wall.

In one embodiment of the present invention, the four walls of the barrier wall are closely connected together as a monolithic piece.

The present invention also provides a method for manufacturing a liquid crystal display. The method includes providing a substrate having an active area and a non-active area surrounding the active area; providing a sealant at the non-active area of the substrate; providing an alignment film barrier wall at the non-active area between the sealant and the active area, wherein the barrier wall has a wave-shaped configuration; and injecting liquid material for forming an alignment film within the barrier wall to form the alignment film which is located at the active area and extends outwardly to reach barrier wall.

Preferably, the liquid material is liquid polyimide.

Preferably, the barrier wall is rectangular and consists of four walls, four polyimide liquid injection marks are formed on the substrate at four corners of four walls of the barrier wall, each injection mark is located between two neighboring protrusions respectively of two neighboring ones of the four walls, and wherein when the liquid polyimide is injected, the liquid polyimide is first injected at each injection mark.

Preferably, after each injection mark is injected with a drop of the liquid polyimide, the polyimide liquid is then injected at a front of a protrusion near each injection mark.

Preferably, the injected liquid polyimide flows along the wave-shaped wall to enter recesses of the wave-shaped barrier wall.

Preferably, a slit is defined between two adjacent ends of each two adjacent walls of the barrier wall.

Preferably, two adjacent ends of each two adjacent walls of the barrier wall are closely connected together.

BRIEF DESCRIPTION OF SEVERAL VIEWS OF THE DRAWINGS

FIG. 1A depicts a cross-sectional view of a color filter which has an alignment film barrier wall constructed in accordance with prior art and liquid PI flowing toward the barrier wall;

FIG. 1B shows that the liquid PI of FIG. 1A is blocked by the barrier wall and flows upwardly and backwards;

FIG. 1C shows an alignment film formed by the liquid PI of FIG. 1B;

DESCRIPTION OF SPECIFIC EMBODIMENTS OF THE INVENTION

The structure and the technical means adopted by the present invention to achieve the above and other objects can be best understood by referring to the following detailed description of the preferred embodiments and the accompanying drawings. The terms used in the specification such as "up", "down", "front", "rear", "left", "right", "inward", "outward" and "lateral", etc. are the directions of the accompanying drawings. Such directions are used to better understand the invention, not used to limit the invention.

Figure 2:
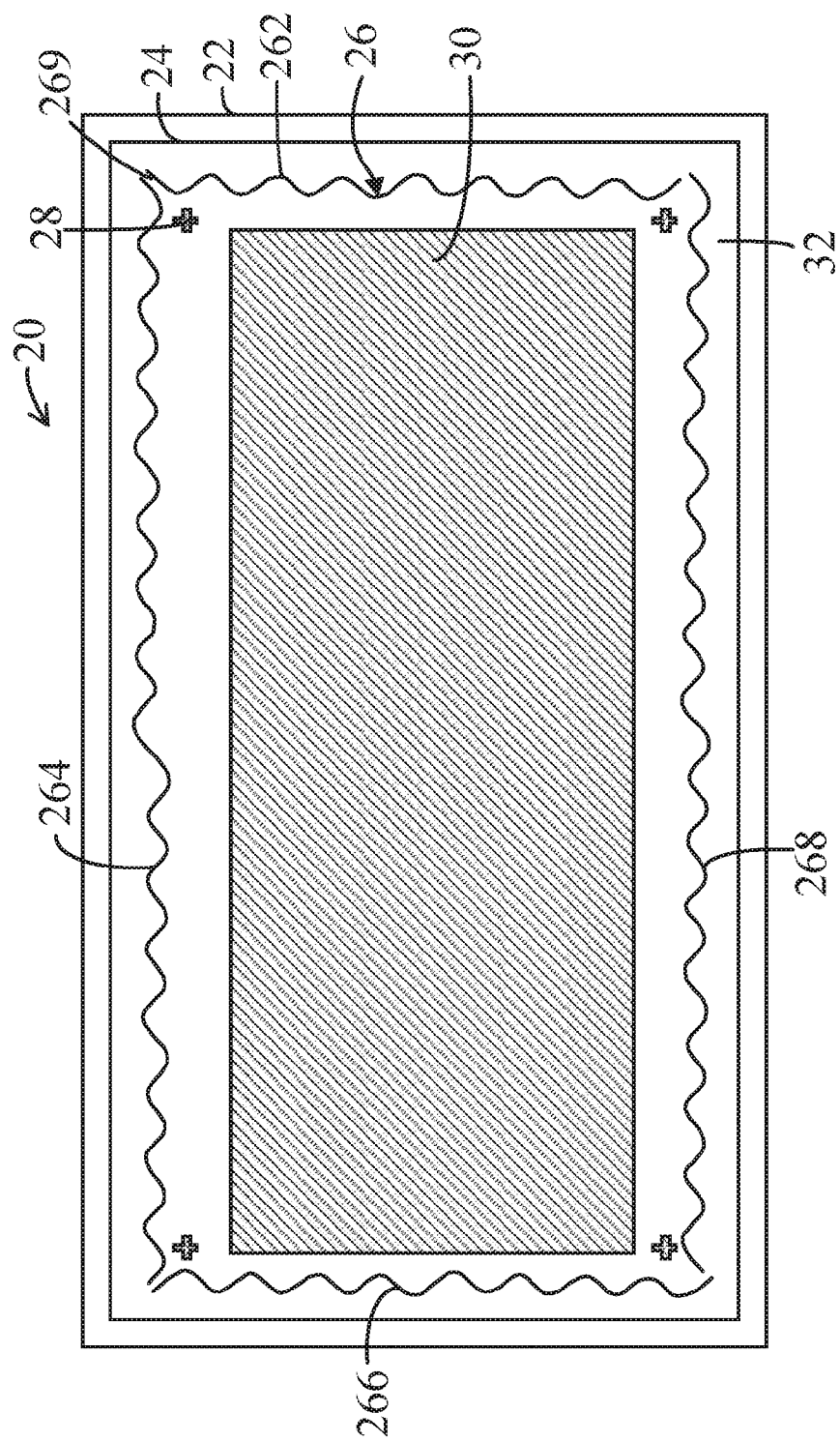
FIG. 2 is a top view showing an alignment film barrier wall constructed in accordance with an embodiment of the present invention.

The present invention is proposed to solve the problems of the uneven thickness of the alignment film and that the applied liquid PI may overflow the barrier wall to cause the liquid PI to reach the sealant. Referring to FIG. 2, it shows a substrate 20 constructed in accordance with the present invention. The substrate 20 can be an array substrate or a color filter. In the preferred embodiment, the substrate 20 is an array substrate. The array substrate 20 has an active area 30 (or called "display area") and a non-active area 32 (or called "non-display area") surrounding the active area 30. The array substrate 20 is rectangular, having a rectangular glass base plate 22, a rectangular sealant 24 formed at a top surface of the glass base plate 22 and located near an edge thereof, and a rectangular alignment film barrier wall 26 for forming an alignment film. The barrier wall 26 is formed on the top surface of the glass base plate 22 and located at the non-active area 32 and between the sealant 24 and the active area 30. The sealant 24 is used for hermetically connecting the array substrate 20 with a color filter (not shown) to prevent liquid crystal molecules of a liquid crystal layer (not shown) from flowing out of a TFT LCD consisting of the array substrate 20, the color filter and the liquid crystal layer.

The barrier wall 26 can be made of polystyrene (PS). The barrier wall 26 has four walls 262, 264, 266, 268 adjacent to each other at four corners of the barrier wall 26. Each wall 262, 264, 266, 268, as viewed from the top, has a wavelike configuration. Four cross liquid PI injection marks 28 are formed on the base plate 22 at the four corners of the barrier wall 26, respectively. Each corner of the barrier wall 26 defines a slit 269. The slit 269 is provided for lessening the reaction force that the barrier wall 26 acting on the liquid PI when the liquid PI is applied to the array substrate 20 to prevent the liquid PI from having an undue backward flow toward the active area 30. The slit 269 is so dimensioned that it is too small to allow the liquid PI to reach the sealant 24. It can be understood by persons skilled in the art that the slits 269 can be omitted whereby the four walls 262, 264, 266, 268 of the barrier wall 26 are closely connected together at the four corners thereof, and the barrier wall 26 is formed as a monolithic piece.

Figure 3:
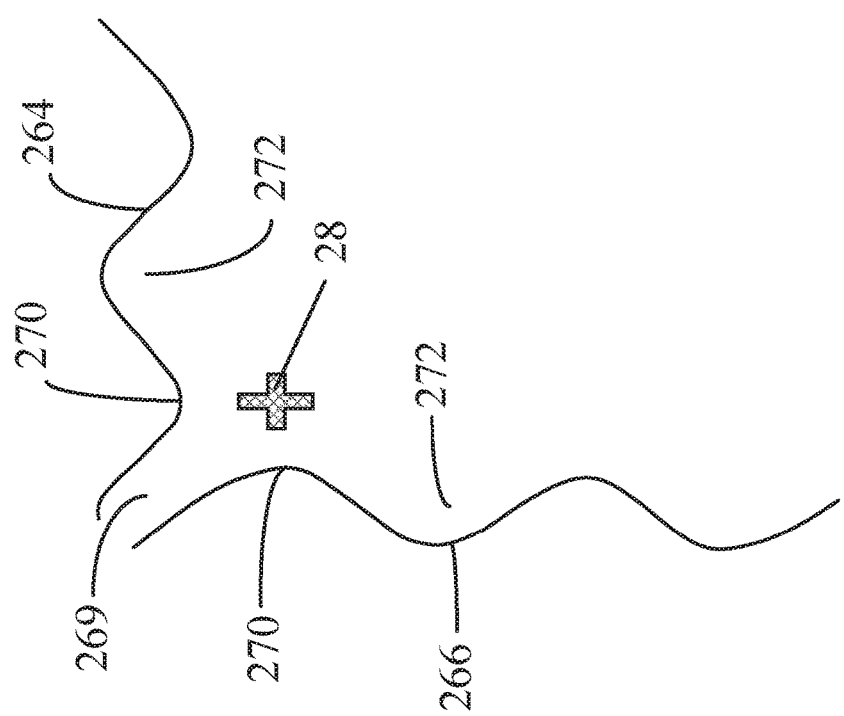
FIG. 3 is an enlarged view of a corner of the barrier wall of FIG. 2.

Referring to FIG. 3, it shows an enlarged view of a corner of the barrier wall 26. From FIG. 3, it can be seen that each wall 264 (266) has protrusions 270 projecting toward the active area 30 and recesses 272 recessed from the active area 30. The cross injection mark 28 is located between two adjacent protrusions 270 respectively of the two walls 264, 266 at the corner of the barrier wall 26. When the liquid PI is injected, a first drop of the liquid PI is injected at the cross injection mark 28.

Figure 4:
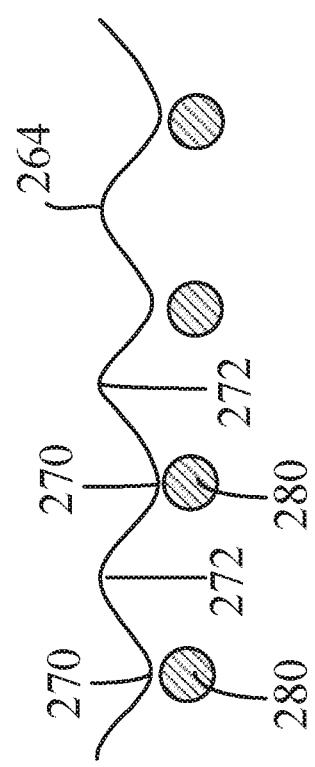
FIG. 4 is an enlarged view of a linear portion of the barrier wall of FIG. 2, wherein liquid PI is injected at a first position.

Referring to FIG. 4, it shows an enlarged view of a portion of the wall 264 of the alignment film barrier wall 26. Each two of the protrusions 270 are spaced from each other with a fixed distance. After the first drop of liquid PI is injected on the cross injection mark 28, the injection needle (no shown) is moved with the fixed distance each time to inject a liquid PI drop 280 at a front of each of the protrusions 270 successively away from the injection mark 28.

Figure 5:
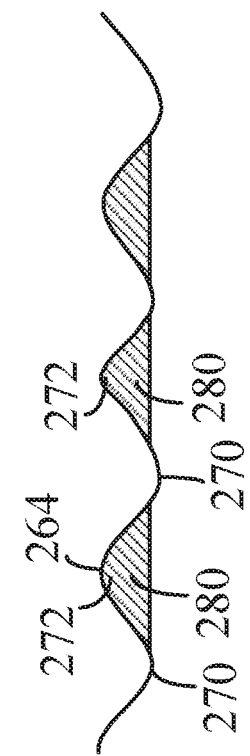
FIG. 5 shows the liquid PI of FIG. 4 flows from the first position to reach a second position.

Referring to FIG. 5, the liquid PI drops injected on the fronts of the protrusions 270 flow along the protrusions 270 to enter the recesses 272. Here since the barrier wall 26 of the present invention is configured to have a wavelike shape, the liquid PI flowing toward the barrier wall 26 and blocked thereby will flow along arc-shaped profile of the protrusions 270 and the intermediate parts interconnecting the protrusions 270 and the recesses 272 of the barrier wall 26 to enter the recesses 272 whereby the reaction force of the barrier wall 26 acting on the injected liquid PI can be lessened. Thus, the liquid PI will not overflow the barrier wall 26 and a control of the spread boundary of the applied liquid PI can be realized.

By the wavelike design of the barrier wall 26 and the injection of the liquid PI drops at the fronts the protrusions 270 of the barrier wall 26, the present invention can effectively prevent the liquid PI from overflow through the barrier wall 26. Thus, a risk that the sealant 24 may be contaminated by the liquid PI which may result in a peeling-up of the sealant 24 can be avoided. In addition, since the liquid PI can smoothly flow along the barrier wall 26, the large reaction force acting on the liquid PI by the barrier wall 24 can no longer exist, the drawbacks that the backward flowed liquid PI accumulates at a place near the barrier wall 26 which can cause the alignment film to have an uneven thickness and accordingly a gap mura can be avoided. Thus the yield rate of the liquid crystal display manufactured in accordance with the present invention can be effectively improved.

The above descriptions are merely preferable embodiments of the present invention, and are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A liquid crystal display comprising:
a substrate defining an active area and a non-active area surrounding the active area;
a sealant located at the non-active area of the substrate, configured from hermetically connecting with another substrate to seal a crystal layer between the substrate and the another substrate;
a rectangular alignment film barrier wall formed on the non-active area of the substrate and located between the sealant and the active area; and
an alignment film formed on the active area of the substrate and extending outward to reach the barrier wall;
wherein the barrier wall has four walls each having a wavelike configuration;
wherein the alignment film is made of polyimide (PI) and the barrier wall is made of polystyrene (PS); and
wherein the substrate forms a liquid PI injection mark at a corner between a wall and an adjacent wall of the barrier wall.

2. The liquid crystal display of claim 1, wherein the injection mark is located between two neighboring protrusions respectively of two adjacent walls of the barrier wall.

3. The liquid crystal display of claim 2, wherein the substrate is at least one of an array substrate and a color filter.

4. The liquid crystal display of claim 1, wherein a slit is defined between two confronting ends of two adjacent walls of the barrier wall.

5. The liquid crystal display of claim 1, wherein the four walls of the barrier wall are closely connected together whereby the barrier wall is a monolithic piece.

6. A liquid crystal display comprising:
a substrate defining an active area and a non-active area surrounding the active area;
a sealant located on the non-active area;
an alignment film barrier wall formed on the non-active area and located between the sealant and the active area; and
an alignment film formed on the active area of the substrate and extending outward to reach the barrier wall;
wherein the barrier wall has a wavelike configuration;
wherein the alignment film is made of polyimide (PI) and the barrier wall is made of polystyrene (PS);
wherein the barrier wall is rectangular, consisting of four walls, each two neighboring walls having a slit defined therebetween; and
wherein a liquid PI injection mark is formed on the substrate at a location of a corner of the barrier wall between one of the four walls and an adjacent wall.

7. The liquid crystal display of claim 6, wherein the liquid PI injection mark is located between two protrusions respectively of the one wall and the adjacent wall.

8. The liquid crystal display of claim 7, wherein the substrate is at least one of an array substrate and a color filter.

9. A method of manufacturing a liquid crystal display comprising:
providing a substrate having an active area and a non-active area surrounding the active area;
providing a sealant at the non-active area of the substrate;
providing an alignment film barrier wall at the non-active area and between the sealant and the active area, wherein the barrier wall has a wave-shaped configuration; and
injecting liquid material for forming an alignment film within the barrier wall to form the alignment film which is located at the active area and extends outwardly to reach barrier wall;
wherein the liquid material is liquid polyimide; and
wherein the barrier wall is rectangular and consists of four walls, four liquid polyimide injection marks are formed on the substrate at four corners of the four walls of the barrier wall, each injection mark is located between two neighboring protrusions respectively of two neighboring ones of the four walls, and wherein when the liquid polyimide is injected, the liquid polyimide is first injected at the each injection mark.

10. The method of claim 9, wherein after the each injection mark is injected with the liquid polyimide, the liquid polyimide is injected at a front of a protrusion near the each injection mark.

11. The method of claim 10, wherein the injected liquid polyimide flows along the wave-shaped barrier wall to enter recesses of the wave-shaped barrier wall.

12. The method of claim 11, wherein a slit is defined between two adjacent ends of each two adjacent walls of the barrier wall.

13. The method of claim 11, wherein two adjacent ends of each two adjacent walls of the barrier wall are closely connected together.

* * * * *